United States Patent
Davis et al.

[11] 3,821,562
[45] June 28, 1974

[54] THERMOCOUPLE AMPLIFIER

[75] Inventors: James L. Davis; Edward L. Lopke, both of Kokomo; Leslie J. Pechous, Carmel, all of Ind.

[73] Assignee: General Motors Corporation, Detroit, Mich.

[22] Filed: July 20, 1973

[21] Appl. No.: 381,055

[52] U.S. Cl............... 307/117, 73/359, 317/133.5, 340/228 R
[51] Int. Cl............................................. H01h 35/00
[58] Field of Search ......... 307/117, 116; 317/133.5, 317/148.5 R; 73/359, 343 R, 344; 340/228 R, 255, 409

[56] References Cited
UNITED STATES PATENTS
3,225,268   12/1965   Metzadour.................. 317/133.5 X Primary Examiner—Robert K. Schaefer
Assistant Examiner—M. Ginsburg
Attorney, Agent, or Firm—Paul Fitzpatrick

[57] ABSTRACT

A thermocouple system includes an operational amplifier connecting a thermocouple to an output line with arrangements to provide an abnormally low output when there is a ground or short in the thermocouple or its leads. The positive thermocouple lead is connected to a point between a controlled voltage positive supply and ground of a voltage divider network including a cold junction compensator. The negative lead of the thermocouple is connected to the controlled positive line through a resistor and to the normal inverting input of the operational amplifier. If the thermocouple circuit opens, the normal drop through the voltage divider is lost and the amplifier input goes to a high voltage level and the output to a low level. The operational amplifier output may be overridden by a switching transistor which is normally held turned off by a normally conducting first stage transistor. The first stage transistor is of the NPN type with emitter grounded and collector connected through a resistor to the positive supply. The base of this transistor is connected to a point in the thermocouple voltage divider circuit between the thermocouple and ground so that grounding of the positive thermocouple lead turns it off. The base of this transistor is also connected through a diode to the negative thermocouple lead, the diode having a lower voltage drop than the base-emitter circuit of the transistor, so that grounding the negative thermocouple lead also turns it off.

6 Claims, 2 Drawing Figures

PATENTED JUN 28 1974

3,821,562

THERMOCOUPLE AMPLIFIER

Our invention is directed to thermocouple circuits and particularly to a thermocouple amplifier system which responds to faults in the circuits connecting the amplifier to the thermocouple to provide an identifiable spurious output upon the occurrence of a short or ground in the thermocouple circuit. More specifically, our invention is directed to thermocouple amplifier circuits which provide an indication of an excessively low thermocouple temperature in response to such faults so that thermocouple will automatically provide a lower output signal than a companion thermocouple which is not affected by such a fault.

The invention may also be regarded as directed to providing improved thermocouple circuits for control of engines such as gas turbine engines. Systems for control of gas turbine engines frequently include thermocouples in the hot zone of the engine; for example, in the turbine inlet or turbine exhaust conduit, which measure the temperature level of the engine to control fuel so as to prevent the occurrence of destructive temperatures in the engine. Because of the small potential generated by such thermocouples, it is necessary as a practical matter to employ an amplifier to provide a signal of usable magnitude for control purposes. Also, because of the extremely hostile environment in which such thermocouples operate, the thermocouple or the wiring harness leading to it may be subjected to failures such as open circuits or grounds.

For these reasons, it has been common practice to employ two thermocouples in similar locations in the engine and rely on the thermocouple which provides the higher output as means for indicating or controlling temperature. However, it is quite possible for both thermocouples in such an engine to have some fault resulting in too low temperature indications, thus depriving the engine of protection against overtemperature.

Our invention is directed to providing a very simple, accurate, and reliable circuit for amplifying the output of a thermocouple and for responding to open circuits and grounds to provide a very low temperature output signal such as would not be reached in the normal operation of the controlled system.

The principal objects of our invention are to provide improved control of gas turbine engines and other systems in which control of temperature is required; to provide improved thermocouple amplifiers; and to provide a thermocouple circuit which inherently discriminates between normal thermocouple emf and emf resulting from grounded or open circuits in the thermocouples.

The nature of our invention and its advantages will be clear to those skilled in the art from the succeeding detailed description of the preferred embodiment of the invention and the accompanying drawings.

Figure 1:
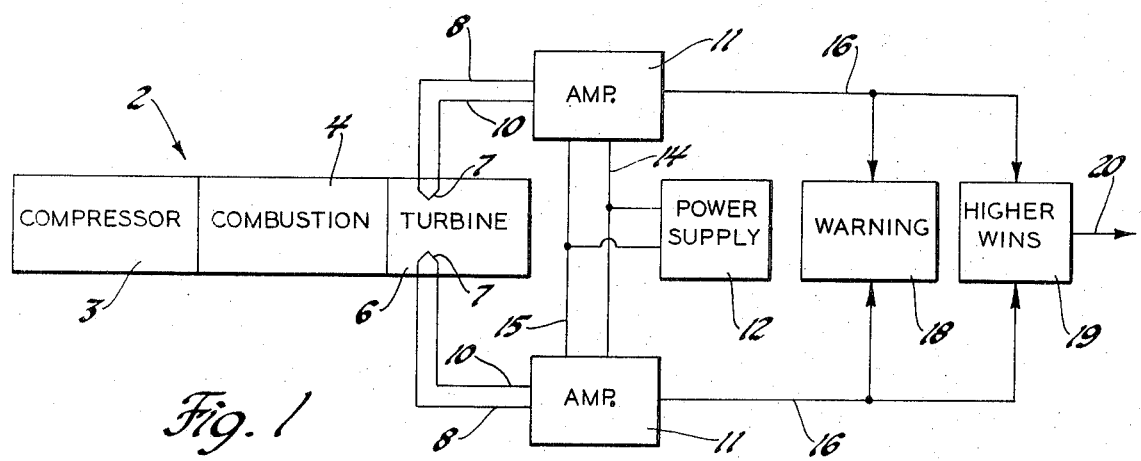
FIG. 1 is a schematic diagram of a thermocouple installation for control of a gas turbine engine.
Figure 2:
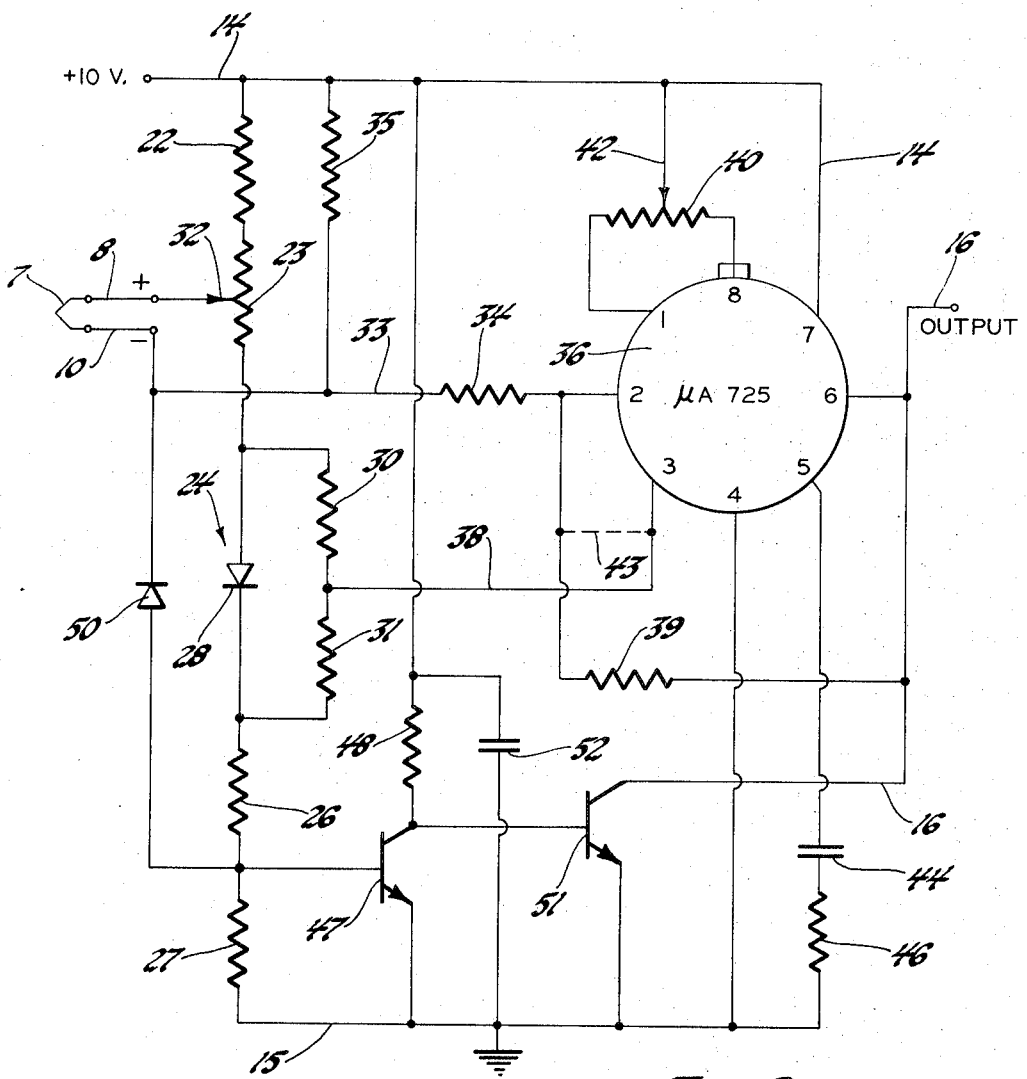
FIG. 2 is a wiring diagram of a thermocouple amplifier.

Referring first to FIG. 1, a gas turbine engine 2 is indicated as including the usual compressor 3, combustion apparatus 4, and turbine 6, driving the compressor. The engine may provide an output of gas or shaft power as desired. Temperature of the hot gas flowing through the turbine is measured by two similarly situated thermocouples 7, each of which is connected by leads 8 and 10 to an amplifier 11. The amplifiers are energized from a power supply device 12 which provides an accurately controlled constant voltage DC input. Referring to FIG. 2, a 10 volt positive input is indicated at 14 and the ground or return at 15.

Each amplifier provides an output potential which varies with the temperature to which the thermocouple is exposed on its output line 16. The lines 16 may be connected to a warning circuit 18 which provides a warning if there is a predetermined disparity between the signals from the two thermocouples which should be equal within reasonable limits of error of the equipment, or if there is an unreasonably low signal. The output lines 16 are also connected to a higher wins circuit 19 which connects the thermocouple output line having the higher voltage; that is, higher temperature indication, to a line 20 leading to a means for controlling supply of fuel to the engine or an indicator, or whatever is desired.

It may be pointed out that the power supply 12, warning circuit 18, and higher wins circuit 19 are not specifically elements of this invention, which is in the amplifier 11.

Referring now to FIG. 2, a thermocouple 7, thermocouple leads 8 and 10, the controlled 10 volt input lines 14 and 15 from the power supply, and the amplifier output line 16 are identified as on FIG. 1. The output potential is measured from line 16 to ground.

Before proceeding with the description of this amplifier, it may be pointed out that detailed values and identification of components are included in the general description of the circuit to identify presently preferred circuit elements so that the construction of the preferred embodiment of the system will be readily apparent. However, the values of these elements are a matter of judgment and may be changed in any situation to suit requirements. They may be varied, depending upon the temperature range to be covered by thermocouple, the nature of the thermocouple, the nature of the circuit to which the output is directed, and advances in semiconductor technology, for example.

Proceeding with the amplifier circuit, the positive line 14 is connected through resistor 22 (3.9 kilohms), a potentiometer 23 (50 ohms), a cold junction temperature compensating circuit 24, a resistor 26 (3.9 kilohms), and a resistor 27 (10 kilohms) to ground or return line 15. Resistor 27 is shunted by the base-emitter circuit of a transistor 47 for reasons to be described later, but this merely affects the potential level at points along the voltage divider circuit without significant effect on normal operation. The cold junction compensating circuit 24 comprises a diode 28 (Delco Service No. 31) shunted by the series circuit of a resistor 30 (200 ohms) and a resistor 31 (6.8 kilohms). The variable tap 32 of potentiometer 23 is connected to lead 8 and thus to the positive terminal of thermocouple 7. The drop across the elements 22 through 31 of the voltage divider circuit referred to above establish a normally substantially constant potential level at tap 32. The emf generated by the thermocouple, in response to the temperature to which it is exposed, establishes a potential on line 10 with reference to that on line 8 which is lower, as indicated by the negative symbol. Thermocouple line 10 is directly connected through a line 33 and an amplifier input resistor 34 (1,000 ohms) to the inverting input of an operational amplifier 36. Line 33 is also connected through resistor 35 (100 kilohms) to the 10 volt supply line.

Amplifier 36 may be any suitable precise operational amplifier which tolerates having its output grounded or has its output otherwise protected. Specifically, the operational amplifier currently employed is a Fairchild Instrumentation Operational Amplifier Model µA725. The non-inverting input of the amplifier is connected by a lead 38 to a point between resistors 30 and 31. The potential at this point is determined by the voltage divider 22, 23, 30, 31, 26, 27, as modified by the variation in potential drop of diode 28 with temperature at the amplifier, representing the cold junction temperature. The input datum level and thus output datum level of the amplifier may be varied by adjusting the tap 32 of potentiometer 23 which sets the input datum on the inverting input of the amplifier.

The operational amplifier 36 is energized by the controlled power supply, with pin 7 connected to positive and pin 4 to ground. The output pin 6 of the amplifier from pin 6 is connected to the output lead 16, and through a feedback resistor 39 (130 kilohms) to the inverting input. Pins 1 and 8 of amplifier 36 are connected to a voltage offset nulling potentiometer 40 (100 kilohms) the center tap 42 of which is connected to the 10 volt supply. This potentiometer is adjusted to provide a mid-range amplifier output when the inputs at pins 2 and 3 are equal. For setting the potentiometer the two amplifier inputs are temporarily bridged, as indicated by the broken line 43.

Pin 5 of the amplifier is connected to ground through a capacitor 44 (0.0022 mf) and a resistor 46 (56 ohms) in series, this being a stabilizer connection to prevent oscillation in the operational amplifier.

The circuit so far described except for resistor 35 may be considered to be simply the thermocouple amplifier without regard to provisions for the desired response to thermocouple circuit failures. Resistor 35 is of high resistance and has no significant effect on normal operation of the system.

Operation may be summarized briefly as follows: The difference in potential between tap 32 of potentiometer 23 and the inverting input of the amplifier equals the generated emf of thermocouple 7. The input to the noninverting input pin 3 of the amplifier is constant except for the cold junction compensating effect of diode 28. The difference between inputs determines the amplifier output. The ratio of resistor 39 to resistor 34 is 130 to 1 so that output voltage increment is 130 times the input increment. In a specific case, the normal range of the output voltage is from 1½ volts minimum to 8½ volts maximum.

Now as to the discriminating or fail-safe features of the amplifier circuit, we may first consider the fact that resistor 35 creates a response to open circuits in the thermocouple and its lines 8 and 10. A small constant current flows in normal operation from the 10 volt line through high resistance 35, the thermocouple and its leads, a portion of potentiometer 23, the temperature compensating circuit 24, and resistors 26 and 27 to ground. This current is effectively determined by the setting of tap 32 but may vary immaterially because of changes in the thermocouple emf. In normal operation, the resistor 35 has no effect on the input to the operational amplifier. However, if the connection between the positive and negative thermocouple terminals of the amplifier is opened, the input to the amplifier through resistor 22, potentiometer 23, and the thermocouple is terminated and the amplifier is connected to the positive 10 volt line through resistors 35 and 34. Effectively, the potential on inverting input 2 is driven from the normal value of about 6 volts to substantially 10 volts, thus providing at the amplifier the equivalent of a below zero temperature signal from the thermocouple. The output from the amplifier through line 16 thus represents a voltage which would represent a turbine temperature of lower than 40° below zero F., which demonstrates the failure of the thermocouple circuit. This not only takes the thermocouple out of action through the higher wins circuit 19 of FIG. 1, but also will operate the warning circuit 18.

If there is a short circuit between leads 8 and 10, this in effect gives an input from the thermocouple of the ambient temperature at the point of the short circuit and thus provides a low amplifier output. This is true also of conventional thermocouple amplifiers.

The means for responding to grounds on either of the lines 8 or 10 is a specially controlled switching circuit which provides a potential near ground on output line 16, overriding the output of the operational amplifier. This circuit comprises a base-driven NPN transistor 47, the emitter of which is grounded and the collector of which is connected through resistor 48 (10 kilohms) to the 10 volt supply line. The base of transistor 47 is connected to the junction of resistors 26 and 27 and also through a diode 50 to the negative thermocouple terminal and thermocouple line 10. The collector of transistor 47 is connected to the base of an NPN transistor 51, the emitter of which is grounded and the collector of which is connected directly to the output line 16. The transistors are Delco Service No. 67 and the diode 50 is a HP 5082-2810.

Normally, the voltage drop across resistor 27 of the voltage divider circuit from supply line 14 to ground biases transistor 47 to conduct, and the IR drop in resistor 48 lowers the potential of the base of transistor 51 below its conducting threshold. However, if transistor 47 is turned off, transistor 51 is biased through resistor 48 to turn on.

If thermocouple lead 8 is grounded, the voltage at point 32 of the potentiometer 23 is zero as is the voltage on line 15, so that the base of transistor 47 is brought to zero potential and it turns off. In the event of ground on the negative thermocouple line 10, the base of transistor 47 is grounded through the diode 50 and line 10. This diode is selected as one which has a lower forward voltage drop than the base-emitter drop of transistor 47. Thus diode 50 pulls the base of transistor 47 to a low enough potential that transistor 47 is turned off, turning on transistor 51 and pulling down the emf on output line 16 to indicate below minus 40°F. temperature.

The capacitor 52 (22 mf) connected across the power input line is simply a filter intended to act as a noise suppressor for transients in the power line.

It will be seen from the foregoing that the circuit described is well adapted to perform the desired and stated function and is of a simple character.

The detailed description of the preferred embodiment of the invention for the purpose of explaining the principles thereof is not to be considered as limiting or restricting the invention, since many modifications may be made by the exercise of skill in the art.

We claim:

1. A temperature-responsive system comprising a thermocouple; a power input connectable to a constant-voltage source; voltage-divider means connected to the power input establishing a datum potential for one terminal of the thermocouple; an amplifier having an input connected to the other terminal of the thermocouple and providing an output varying with thermocouple emf; switching means connected to the amplifier effective when operative to provide an extreme limit output signal; the switching means including a control electrode responsive to voltage shift past a predetermined threshold to put the switching means in operative condition; and means connecting the control electrode to the voltage-divider means and through unidirectional conducting means to the said other terminal of the thermocouple, so that a ground on either thermocouple terminal shifts the voltage on the control electrode to cause the switching means to become operative to provide the extreme limit output signal.

2. A temperature-responsive system comprising a thermocouple; a power input connectable to a constantvoltage source; voltage-divider means connected to the power input establishing a datum potential for one terminal of the thermocouple; an amplifier having an input connected to the other terminal of the thermocouple and providing an output varying with thermocouple emf; a high-resistance connection from the amplifier input to the power input effective when the thermocouple circuit is opened to cause the amplifier to provide an extreme limit signal; switching means connected to the amplifier output and effective to override the amplifier output and provide an extreme limit signal when operative; the switching means including a control electrode responsive to voltage shift past a predetermined threshold to put the switching means in operative condition; and means connecting the control electrode to the voltage-divider means and through unidirectional conducting means to the said other terminal of the thermocouple, so that a ground on either thermocouple terminal shifts the voltage on the control electrode to cause the switching means to override the amplifier.

3. A system as recited in claim 2 in which the voltage-divider means includes cold junction temperature compensating means.

4. A thermocouple amplifier effective to provide a recognizably spurious output in response to faults in the thermocouple circuit providing the input to the amplifier comprising, in combination, means for connection to a controlled-potential power source; a voltage divider connected across the source having a tap connected to the positive thermocouple lead; an operational amplifier having an output representing thermocouple emf and having an inverting input connected to the negative thermocouple lead side of the source; a switching circuit including a control input connected to the said voltage divider and having an output connected to the amplifier output and effective when the switching circuit turns on to override the amplifier, the switching circuit also having its said input connected through a unidirectional conductor to the negative thermocouple lead, so that grounding of either thermocouple lead operates the control input to override the amplifier.

5. A temperature-responsive system including a thermocouple circuit, an output line, and an amplifier coupling the thermocouple circuit to the output line, in combination with means operative in response to faults in the thermocouple circuit to provide a recognizably spurious signal in the output line, the said means comprising, in combination, means providing a resistive connection between one terminal of the thermocouple circuit and one side of a power supply circuit; voltage divider means providing resistive connections between the other terminal of the thermocouple circuit and both sides of the power supply circuit; the amplifier having a differential input connected to the two terminals of the thermocouple circuit, so that an open thermocouple circuit drives the amplifier output to the spurious value; switching means for connecting the output line to a source of potential of magnitude representing the spurious value; the switching means having a control input effective to close the switching means upon the occurrence of a predetermined threshold potential in the control input; unidirectional conducting means connecting the said control input to the said one terminal of the thermocouple circuit; and the control input being coupled through one of the resistive connections of the voltage divider means to the said other terminal of the thermocouple circuit, so that grounding either terminal of the thermocouple circuit closes the switching means.

6. A thermocouple amplifier effective to provide a recognizably spurious output in response to faults in the thermocouple circuit providing the input to the amplifier comprising, in combination, means for connection to a controlled-potential power source; a voltage divider connected across the source having a tap connected to one thermocouple lead; an operational amplifier having an output representing thermocouple emf and having an inverting input connected to the other thermocouple lead and connected through a resistor to one side of the source so that an open circuit between the thermocouple leads provides a strong simulated cold temperature signal to the amplifier; a switching circuit including a control input connected to the said voltage divider and having an output connected to the amplifier output and effective when the switching circuit turns on to override the amplifier, the switching circuit also having its said input connected through a unidirectional conductor to the other thermocouple lead, so that grounding of either thermocouple lead operates the control input to override the amplifier.

* * * * *